(12) United States Patent
Lee et al.

(10) Patent No.: US 11,909,073 B2
(45) Date of Patent: Feb. 20, 2024

(54) BATTERY MODULE HAVING OVERCHARGE PREVENTION STRUCTURE, BATTERY PACK COMPRISING THE SAME, AND VEHICLE COMPRISING THE BATTERY PACK

(71) Applicant: LG ENERGY SOLUTION, LTD., Seoul (KR)

(72) Inventors: Han-Young Lee, Daejeon (KR); Bum-Young Jung, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 48 days.

(21) Appl. No.: 17/625,597

(22) PCT Filed: Jul. 10, 2020

(86) PCT No.: PCT/KR2020/009146
§ 371 (c)(1),
(2) Date: Jan. 7, 2022

(87) PCT Pub. No.: WO2021/006709
PCT Pub. Date: Jan. 14, 2021

(65) Prior Publication Data
US 2022/0285801 A1    Sep. 8, 2022

(30) Foreign Application Priority Data

Jul. 10, 2019  (KR) .................. 10-2019-0083357

(51) Int. Cl.
*H01M 50/574*  (2021.01)
*H01M 10/637*  (2014.01)
(Continued)

(52) U.S. Cl.
CPC ....... *H01M 50/574* (2021.01); *H01M 10/637* (2015.04); *H01M 50/51* (2021.01); *H02J 7/00302* (2020.01)

(58) Field of Classification Search
CPC ... H01M 10/623; H01M 50/574; H01M 50/51
See application file for complete search history.

(56) References Cited

U.S. PATENT DOCUMENTS 5,631,100 A    5/1997  Yoshino et al.
6,377,432 B1   4/2002  Hashimoto
(Continued)

FOREIGN PATENT DOCUMENTS

JP    2000-311575 A    11/2000
JP    2011-40368 A      2/2011
(Continued)

OTHER PUBLICATIONS

International Search Report for PCT/KR2020/009146 dated Oct. 29, 2020.

*Primary Examiner* — Karie O'Neill Apicella
(74) *Attorney, Agent, or Firm* — Birch, Stewart, Kolasch & Birch, LLP

(57) ABSTRACT

A battery module includes a first battery cell and a second battery cell respectively having a positive electrode lead and a negative electrode lead and connected to each other in series; and a short circuit inducing member having one longitudinal side interposed between the negative electrode lead of the first battery cell and the positive electrode lead of the second battery cell and the other longitudinal side located between the positive electrode lead of the first battery cell and the negative electrode lead of the second battery cell. When a potential difference between the negative electrode lead of the first battery cell and the positive electrode lead of the second battery cell increases over a reference value, the other longitudinal side of the short (Continued)

circuit inducing member makes flexural deformation toward the negative electrode lead of the second battery cell to come into contact with the negative electrode lead.

10 Claims, 4 Drawing Sheets

(51) Int. Cl.
*H02J 7/00* (2006.01)
*H01M 50/51* (2021.01)

(56) References Cited

U.S. PATENT DOCUMENTS

| | | | |
|---|---|---|---|
| 8,217,629 B2 | 7/2012 | Pinto, IV et al. | |
| 2005/0112427 A1* | 5/2005 | Bailey | H01M 4/00 429/432 |
| 2006/0263676 A1 | 11/2006 | Chang et al. | |
| 2006/0275653 A1* | 12/2006 | Chang | H01M 50/574 337/16 |
| 2011/0039147 A1 | 2/2011 | Cheon et al. | |
| 2015/0064517 A1 | 3/2015 | Han et al. | |
| 2020/0127337 A1 | 4/2020 | Kim et al. | |

FOREIGN PATENT DOCUMENTS

| | | |
|---|---|---|
| JP | 2013-239442 A | 11/2013 |
| KR | 10-0358224 B1 | 10/2002 |
| KR | 10-0659836 B1 | 12/2006 |
| KR | 10-0770116 B1 | 10/2007 |
| KR | 10-2018-0091446 A | 8/2018 |
| KR | 10-2019-0059831 A | 5/2019 |

* cited by examiner

BATTERY MODULE HAVING OVERCHARGE PREVENTION STRUCTURE, BATTERY PACK COMPRISING THE SAME, AND VEHICLE COMPRISING THE BATTERY PACK

TECHNICAL FIELD

The present disclosure relates to a battery module having an overcharge prevention structure, a battery pack including the battery module, and a vehicle including the battery pack. More specifically, the present disclosure relates to a battery module including a current blocking member that is modified according to a potential difference between both ends thereof to prevent overvoltage by generating a short circuit at some battery cells included in the battery module, a battery pack including the battery module, and a vehicle including the battery pack.

The present application claims priority to Korean Patent Application No. 10-2019-0083357 filed on Jul. 10, 2019 in the Republic of Korea, the disclosures of which are incorporated herein by reference.

BACKGROUND ART

At present, fuse devices used in secondary batteries include a positive temperature coefficient (PTC) thermistor, a thermal cut-out (TCO), a thermal fuse, and the like. However, the thermal fuse is disposable. The PTC or TCO can be used repeatedly, but the resistance increases as the PTC or TCO operates repeatedly, thereby increasing its resistance and thus increasing the resistance of the entire circuit.

In addition, the above elements are all operated by heat generated by overcurrent. That is, the above elements operate to block the flow of current only when an overcurrent is generated on a current path of the circuit due to overcharge or the like and thus the temperature is increased.

Therefore, the above elements are capable of blocking the overcurrent by operating only after a situation where safety is already threatened by heat generation, and it is impossible for the above elements to block the overcurrent immediately when a cause that may raise the temperature occurs.

In addition, since the above elements simply operate according to temperature, it is difficult to use the above elements in a secondary battery that exhibits high output, such as a battery pack used in a vehicle. That is, a battery pack for a vehicle requires a high c-rate, and thus much heat is inevitably generated. However, if the elements such as a positive temperature coefficient (PTC), a thermal cut-out (TCO) a thermal fuse are placed in such a high temperature environment, they may be activated too early.

Therefore, it is required to develop a secondary battery adopting a device that may be reusable, be usable in an environment where a high current flows, and block the occurrence of overvoltage caused by overcharge in advance by forcibly generating a short circuit to consume current before the temperature rises if an event that may cause the temperature rise occurs.

DISCLOSURE

Technical Problem

The present disclosure is designed to solve the problems of the related art, and therefore the present disclosure is directed to preventing the occurrence of overvoltage in advance by reversibly generating a short circuit in advance to consume current before the temperature of a secondary battery rises due to heat generation caused by overcurrent.

However, the technical problem to be solved by the present disclosure is not limited to the above, and other objects not mentioned herein will be understood from the following description by those skilled in the art.

Technical Solution

In one aspect of the present disclosure, there is provided a battery module, comprising: a first battery cell and a second battery cell, each battery cell having a positive electrode lead and a negative electrode lead and connected to each other in series; and a short circuit inducing member having one longitudinal side interposed between the negative electrode lead of the first battery cell and the positive electrode lead of the second battery cell to be in contact therewith and the other longitudinal side located between the positive electrode lead of the first battery cell and the negative electrode lead of the second battery cell, wherein when a potential difference between the negative electrode lead of the first battery cell and the positive electrode lead of the second battery cell increases over a reference value, the other longitudinal side of the short circuit inducing member makes flexural deformation toward the negative electrode lead of the second battery cell to come into contact with the negative electrode lead of the second battery cell.

The short circuit inducing member may include an electro active polymer (EAP) layer; a first metal layer formed on one surface of the EAP layer; and a second metal layer formed on the other surface of the EAP layer.

The first metal layer may be electrically connected to the negative electrode lead of the first battery cell, and the second metal layer may be electrically connected to the positive electrode lead of the second battery cell.

When the short circuit inducing member makes the flexural deformation, the second metal layer may come into contact with the negative electrode lead of the second battery cell to induce a short circuit in the second battery cell.

The EAP layer may include at least one polymer electrolyte selected from Nafion, polypyrrole, polyaniline and polythiophene The first metal layer and the second metal layer may include at least one metal selected from the group including platinum, gold, silver and copper.

The battery module may further comprise a connecting line configured to electrically connect the positive electrode lead of the first battery cell and the negative electrode lead of the second battery cell to each other.

The battery module may further comprise a pair of PTC elements interposed between the first metal layer and the negative electrode lead of the first battery cell and between the second metal layer and the positive electrode lead of the second battery cell.

In another aspect, a battery pack according to an embodiment of the present disclosure comprises the battery module according to an embodiment of the present disclosure. In addition, a vehicle according to an embodiment of the present disclosure comprises the battery pack according to an embodiment of the present disclosure.

Advantageous Effects

According to an embodiment of the present disclosure, it is possible to preventing the occurrence of overvoltage in advance by reversibly generating a short circuit in advance to consume current before the temperature of a secondary battery rises due to heat generation caused by overcurrent, thereby securing safety of the secondary battery in use.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

Hereinafter, a battery module 100 according to an embodiment of the present disclosure will be described with reference to FIGS. 1 to 4.

Figure 1:
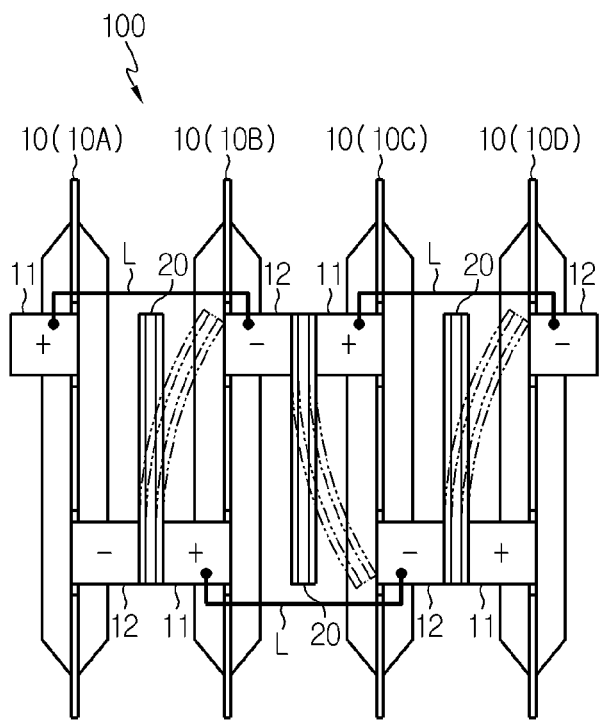
FIG. 1 is a diagram showing a battery module according to an embodiment of the present disclosure.

First, referring to FIG. 1, the battery module 100 according to an embodiment of the present disclosure includes a plurality of battery cells 10 and at least one short circuit inducing member 20, and may further include a connecting line L.

Figure 2:
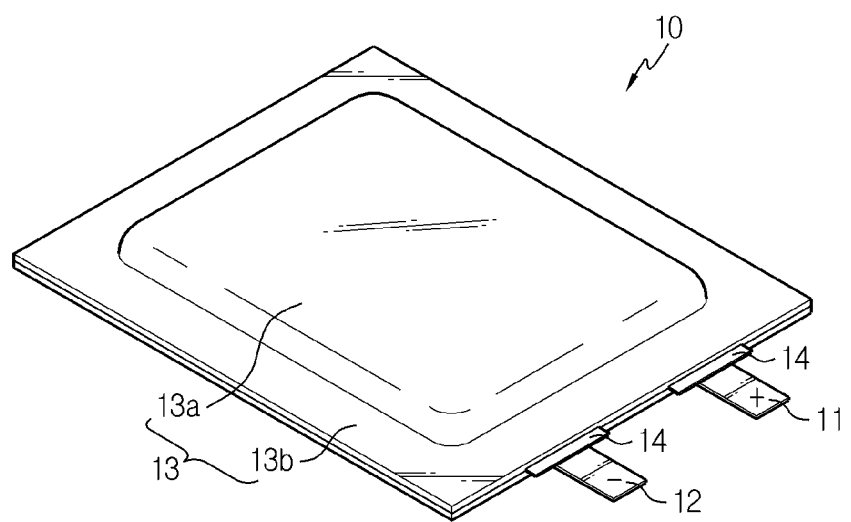
FIG. 2 is a diagram showing a battery cell, employed at the battery module according to an embodiment of the present disclosure.

Referring to FIG. 2 along with FIG. 1, the battery cell 10 includes an electrode assembly (not shown), a positive electrode lead 11, a negative electrode lead 12, a cell case 13, and a sealing tape 14.

Although not shown in the drawings, the electrode assembly has a form in which separators are interposed between positive electrode plates and negative electrode plates that are repeatedly stacked alternately, and separators are preferably positioned at both outermost sides for insulation, respectively.

The negative electrode plate may include a negative electrode current collector and a negative electrode active material layer coated on one side or both sides of the negative electrode current collector, and a negative electrode uncoated region not coated with a negative electrode active material is formed at one side end of the negative electrode plate. The negative electrode uncoated region functions as a negative electrode tab.

The positive electrode plate includes a positive electrode current collector and a positive electrode active material layer coated on one side or both sides of the positive electrode current collector, and a positive electrode uncoated region not coated with a positive electrode active material is formed at one side end of the positive electrode plate. The positive electrode uncoated region functions as a positive electrode tab.

In addition, the separator is interposed between the positive electrode plate and the negative electrode plate to prevent electrode plates having different polarities from directly contacting each other. The separator may be made of a porous material so that ions may be moved using the electrolyte as a medium between the positive electrode plate and the negative electrode plate.

The positive electrode lead 11 is connected to the positive electrode tab by a bonding method such as welding and is drawn out of the cell case 13. The negative electrode lead 12 is connected to the negative electrode tab by a bonding method such as welding and is drawn out of the cell case 13 in the same direction as the positive electrode lead 11. That is, the battery cell 10 applied to the present disclosure corresponds to a one-direction drawing-type battery cell.

The cell case 13 includes two regions, namely an accommodation portion 13a accommodating an electrode assembly (not shown) and a sealing portion 13b extending in a circumferential direction of the accommodation portion 13a and thermally fused in a state where the electrode leads 11, 12 are drawn out to seal the cell case 13.

Although not shown in the figures, the cell case 13 is sealed by affixing and thermally fusing edge portions of an upper case and a lower case made of a multi-layered pouch film in which a resin layer, a metal layer and a resin layer are stacked in order.

The sealing tape 14 is attached to a circumference of each of the positive electrode lead 11 and the negative electrode lead 12 and interposed between the sealing portion 13b of the cell case 13 and the electrode leads 11, 12. The sealing tape 14 is a part applied to prevent the sealing of the cell case 13 from deteriorating due to low adhesion between the inner side of the cell case 13 and the electrode leads 11, 12, in a region of the sealing portion 13b of the cell case 13 where the electrode leads 11, 12 are drawn out.

At least two battery cells 10 are provided, and the battery cells 10 are connected to each other in series. In the figure (FIG. 1) of the present disclosure, a case where four battery cells 10 are connected in series is illustrated as an example, but the present disclosure is not limited thereto. That is, the case where two battery cells 10 are connected in series, the case where three battery cells 10 are connected in series, and the case where five or more battery cells 10 are connected in series are also included within the scope of the present disclosure.

Hereinafter, in describing the present disclosure, the four battery cells 10 shown in FIG. 1 will be distinguishably called a first battery cell 10A, a second battery cell 10B, a third battery cell 10C and a fourth battery cell 10D in order from left to right.

Referring to FIG. 1, the short circuit inducing member 20 is interposed between the negative electrode lead 12 of the first battery cell 10A and the positive electrode lead 11 of the second battery cell 10B, between the negative electrode lead 12 of the second battery cell 10B and the positive electrode lead 11 of the third battery cell 10C, and between the negative electrode lead 12 of the third battery cell 10C and the positive electrode lead 11 of the fourth battery cell 10D, respectively. In this case, the connecting line L connects the positive electrode lead 11 of the first battery cell 10A and the negative electrode lead 12 of the second battery cell 10B to each other, connects the positive electrode lead 11 of the second battery cell 10B and the negative electrode lead 12 of the third battery cell 10C to each other and also connects the positive electrode lead 11 of the third battery cell 10C and the negative electrode lead 12 of the fourth battery cell 10D to each other.

In describing the short circuit inducing member 20, the short circuit inducing member 20 interposed between the negative electrode lead 12 of the first battery cell 10A and the positive electrode lead 11 of the second battery cell 10B will be described as an example.

The short circuit inducing member 20 physically connects the opposite electrode leads 11, 12 of neighboring battery cells 10A, 10B to each other, and its shape is deformed when a potential difference between the negative electrode lead 12 of the first battery cell 10A and the positive electrode lead 11 of the second battery cell 10B increases over a reference value due to overcharge.

Due to this shape deformation, the short circuit inducing member 20 comes into contact with the negative electrode lead 12 of the second battery cell 10B, and accordingly, the positive electrode lead 11 and the negative electrode lead 12 of the second battery cell 10B are directly connected to each other, thereby generating a short circuit. If a short circuit occurs like this, the voltage of the second battery cell 10B drops sharply, and it is possible to escape the risk of overvoltage caused by overcharge.

Figure 3:
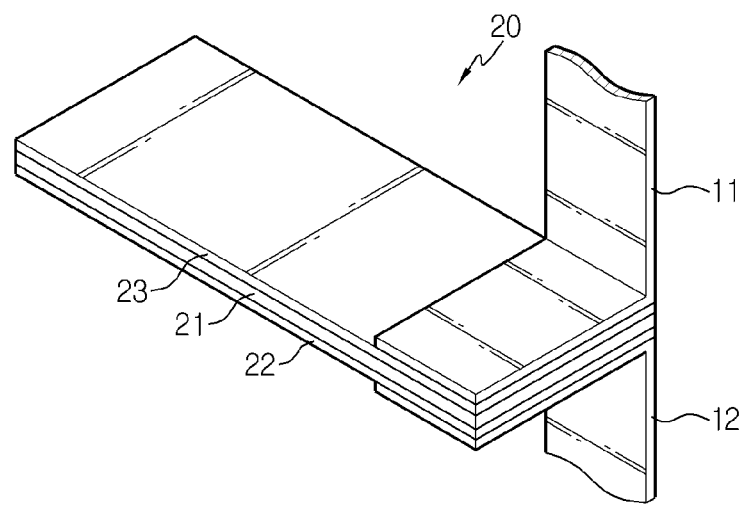
FIG. 3 is a diagram showing a short circuit inducing member and an electrode lead, employed at the battery module according to an embodiment of the present disclosure.
Figure 4:
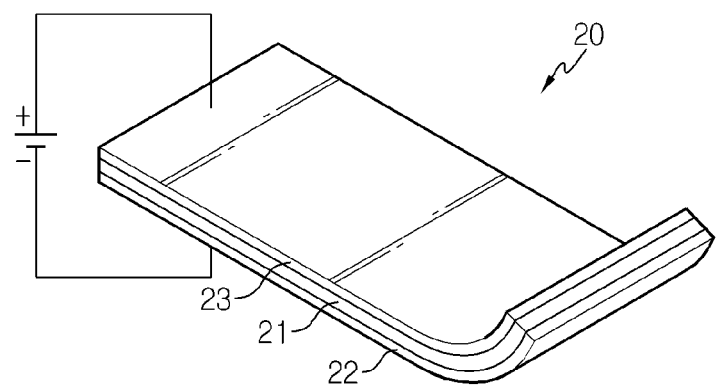
FIG. 4 is a diagram showing flexural deformation of the short circuit inducing member exhibited when a potential difference over a reference value is applied to the short circuit inducing member, employed at the battery module according to an embodiment of the present disclosure.

Referring to FIGS. 3 and 4, a structure and operating principle of the short circuit inducing member 20 for inducing a short circuit through shape deformation according to the potential difference are shown.

First, referring to FIG. 3, the short circuit inducing member 20 includes an electro active polymer (EAP) layer 21, a first metal layer 22 formed on one surface of the EAP layer 21 and a second metal layer 23 formed on the other surface of the EAP layer 21.

The EAP layer 21, namely the electro active polymer layer, corresponds to a layer made of a polymer electrolyte having excellent ion transport properties, and, for example, may include at least one polymer electrolyte selected from Nafion, polypyrrole, polyaniline, and polythiophene.

The first metal layer 22 and the second metal layer 23 are formed on both surfaces of the EAP layer 21, and may be made of metal having excellent electrical conductivity. The metal layers 22, 23 may include, for example, at least one metal selected from platinum (Pt), gold (Au), silver (Ag), and copper (Cu).

If a voltage over the reference value is applied through the metal layers 22, 23 formed on both surfaces of the EAP layer 21, the short circuit inducing member 20 causes shape deformation. Referring to FIG. 4 along with FIG. 1, the short circuit inducing member 20 disposed between the first battery cell 10A and the second battery cell 10B causes a flexural deformation in a direction away from the negative electrode lead 12 of the first battery cell 10A, so that the second metal layer 23 comes into contact with both the positive electrode lead 11 and the negative electrode lead 12 of the second battery cell 10B.

That is, at one longitudinal side of the short circuit inducing member 20, the first metal layer 22 contacts the negative electrode lead 12 of the first battery cell 10A, and the second metal layer 23 contacts the positive electrode lead 11 of the second battery cell 10B. Here, since the second metal layer 23 comes into contact with the negative electrode lead 11 of the second battery cell 10B due to the flexural deformation at the other longitudinal side of the short circuit inducing member 20, a short circuit is generated in the second battery cell 10B.

The principle of the flexural deformation of this short circuit inducing member 20 is as follows. For example, in the case where the first metal layer 22 is connected to the negative electrode lead 12 of the first battery cell 10A and the second metal layer 23 is connected to the positive electrode lead 11 of the second battery cell 10B, the mobility cation that exists inside the polymer electrolyte moves toward the first metal layer 22 charged to negative polarity in a state of being hydrated in water. In this case, since osmotic pressure is caused due to an imbalance in ion concentration between the first metal layer 22 and the second metal layer 23, the amount of water molecules at the first electrode layer 22 charged to negative polarity increases, and thus flexural deformation is made at the short circuit inducing member 20 toward the second metal layer 23.

The potential difference that may cause flexural deformation of the short circuit inducing member 20 depends on the type of polymer electrolyte in the EAP layer 21 used for the short circuit inducing member 20. That is, the reference value of the potential difference mentioned in this specification may vary depending on the type of used polymer electrolyte, and accordingly, by selecting an appropriate polymer electrolyte according to the safety voltage range of the battery cell 10 and the battery module 100 to which the short circuit inducing member 20 is applied, it is possible to prevent the occurrence of danger caused by overvoltage by inducing a short circuit rapidly when an event such as overcharge of the battery module 100 occurs.

Figure 5:
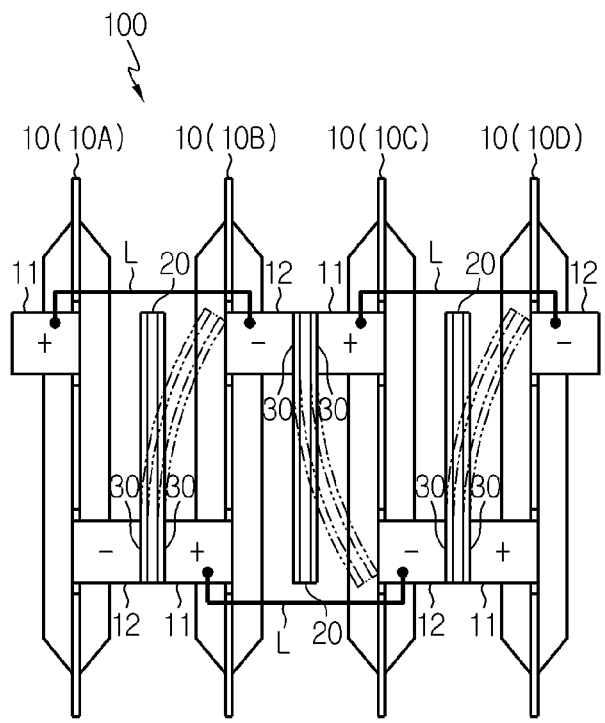
FIG. 5 is a diagram showing a battery module according to another embodiment of the present disclosure.

Next, a battery module 100 according to another embodiment of the present disclosure will be described with reference to FIG. 5.

The battery module 100 according to another embodiment of the present disclosure is different from the battery module 100 according to the former embodiment of the present disclosure just in that at least a pair of PTC elements 30 is more applied, and other components are substantially the same.

Therefore, in describing the battery module 100 according to another embodiment of the present disclosure, the PTC element 30, which is an additionally applied component, will be described in detail, and other components will not be described in detail.

The PTC element 30 has a resistance value gradually increasing as the temperature rises, and if the temperature reaches a reference temperature or higher, the PTC element 30 exhibits an infinite resistance value to substantially block the current completely. The PTC element 30 is interposed between the negative electrode lead 12 of the first battery cell 10A and the first electrode layer 22 and between the positive electrode lead 11 of the second battery cell 10B and the second electrode layer 23. In addition, the PTC element 30 is interposed between the negative electrode lead 12 of the second battery cell 10B and the first electrode layer 22 and between the positive electrode lead 11 of the third battery cell 10C and the second electrode layer 23. Similarly, the PCT element 30 is interposed between the negative electrode lead 12 of the third battery cell 10C and the first electrode layer 22 and between the positive electrode lead 11 of the fourth battery cell 10D and the second electrode layer 23.

In addition, the PTC element 30 may be entirely coated on the first metal layer 22 and the second metal layer 23 of the short circuit inducing member 20.

If the short circuit inducing member 20 operates due to overvoltage generated in the battery module 100 to cause a short circuit, the PTC element 30 may cut off the short circuit current at the reference temperature or above, thereby preventing the risk of ignition or explosion caused by overheating in advance.

Figure 6:
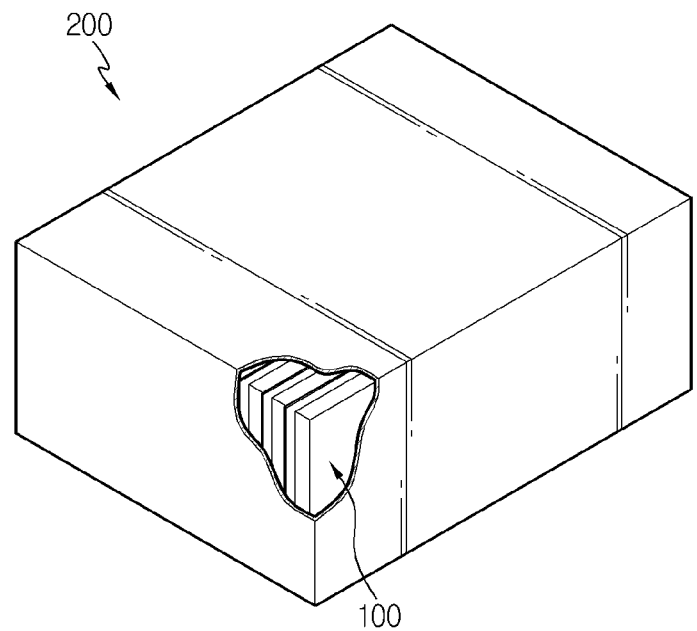
FIG. 6 is a diagram showing a battery pack according to an embodiment of the present disclosure.
Figure 7:
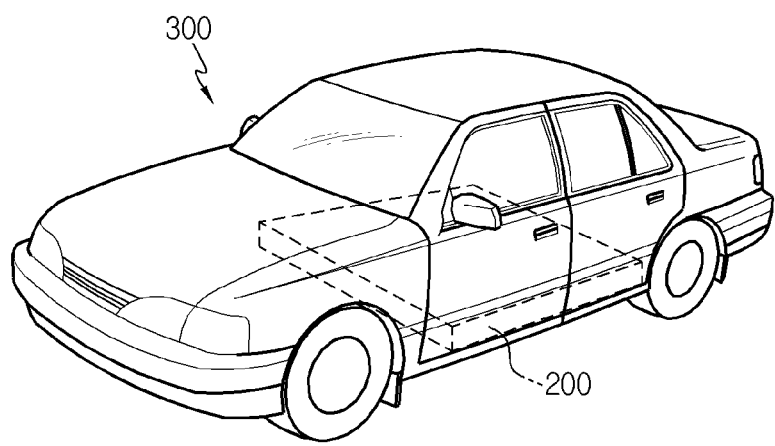
FIG. 7 is a diagram showing a vehicle according to an embodiment of the present disclosure.

Meanwhile, referring to FIG. 6, a battery pack 200 according to an embodiment of the present disclosure may include at least one battery module 100 according to the present disclosure. In addition, referring to FIG. 7, a vehicle according to an embodiment of the present disclosure may include the battery pack 200 according to an embodiment of the present disclosure.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

What is claimed is:

1. A battery module, comprising:
   a first battery cell and a second battery cell, each battery cell having a positive electrode lead and a negative electrode lead and connected to each other in series; and
   a short circuit inducing member having one longitudinal side interposed between the negative electrode lead of the first battery cell and the positive electrode lead of the second battery cell to be in contact therewith and the other longitudinal side located between the positive electrode lead of the first battery cell and the negative electrode lead of the second battery cell,
   wherein when a potential difference between the negative electrode lead of the first battery cell and the positive electrode lead of the second battery cell increases over a reference value, the other longitudinal side of the short circuit inducing member makes flexural deformation toward the negative electrode lead of the second battery cell to come into contact with the negative electrode lead of the second battery cell.

2. The battery module according to claim 1, wherein the short circuit inducing member includes:
   an electro active polymer (EAP) layer having a first and a second surface;
   a first metal layer formed on the first surface of the EAP layer; and
   a second metal layer formed on the second surface of the EAP layer.

3. The battery module according to claim 2, wherein the first metal layer is electrically connected to the negative electrode lead of the first battery cell, and the second metal layer is electrically connected to the positive electrode lead of the second battery cell.

4. The battery module according to claim 2, wherein when the short circuit inducing member makes the flexural deformation, the second metal layer comes into contact with the negative electrode lead of the second battery cell to induce a short circuit in the second battery cell.

5. The battery module according to claim 2, wherein the EAP layer includes at least one polymer electrolyte selected from the group consisting of Nafion, polypyrrole, polyaniline and polythiophene.

6. The battery module according to claim 2, wherein the first metal layer and the second metal layer include at least one metal selected from the group consisting of platinum, gold, silver and copper.

7. The battery module according to claim 1, further comprising:
   a connecting line configured to electrically connect the positive electrode lead of the first battery cell and the negative electrode lead of the second battery cell to each other.

8. The battery module according to claim 2, further comprising:
   a pair of PTC elements interposed between the first metal layer and the negative electrode lead of the first battery cell and between the second metal layer and the positive electrode lead of the second battery cell. claim 1.

9. A battery pack, comprising the battery module according to claim 1.

10. A vehicle, comprising the battery pack according to claim 9.

* * * * *